J. CHASE.
Bee Hive.
No. 80,138. Patented July 21, 1868.
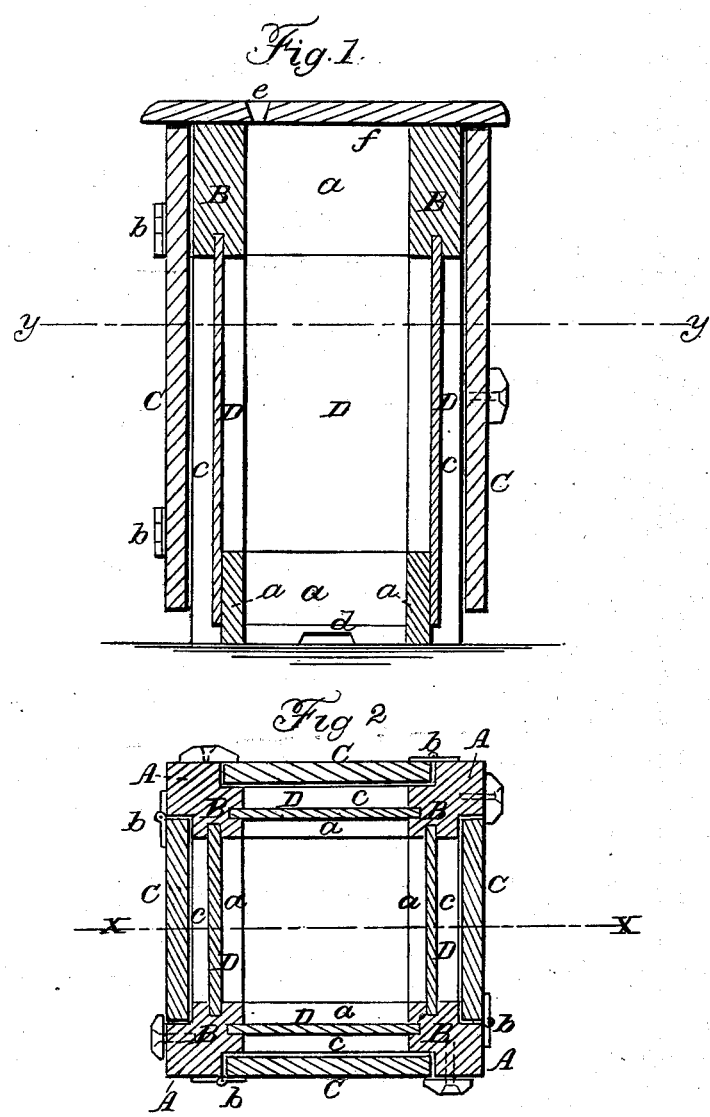

United States Patent Office.

JOSEPH CHASE, OF RIPLEY, OHIO.

Letters Patent No. 80,138, dated July 21, 1868.

IMPROVEMENT IN BEE-HIVE.

*The Schedule referred to in these Letters Patent and making part of the same.*

TO ALL WHOM IT MAY CONCERN:

Be it known that I, JOSEPH CHASE, of Ripley, in the county of Brown, and State of Ohio, have invented a new and improved Bee-Hive; and I do hereby declare that the following is a full, clear, and exact description thereof, which will enable those skilled in the art to make and use the same, reference being had to the accompanying drawings, forming part of this specification.

This invention relates to a new and improved manner of constructing a bee-hive, as hereinafter fully shown and described, whereby the contents of the hive may be readily seen, the bees protected from the ravages of the moth, and the interior of the hive kept at a uniform temperature, or nearly so, being warm in winter and cool in summer.

The invention consists in having the hive constructed with double walls or a double case, the exterior case being of wood, and provided with a door at each side, and the interior case being chiefly of glass, which admits, when the doors of the exterior case are opened, of the interior of the hive being distinctly seen.

A dead-air space is allowed between the two cases.

In the accompanying sheet of drawings—

Figure 1 is a vertical section of my invention, taken in the line $x\ x$, fig. 2.

Figure 2 a horizontal section of the same, taken in the line $y\ y$.

Similar letters of reference indicate corresponding parts.

A A A A represent four corner-posts, constructed of wood, and of right-angular form in their horizontal section.

These posts are nailed, screwed, glued, or otherwise secured to square posts B, the upper and lower parts of which are connected by cross-pieces $a$.

The posts A are secured to the outer corners of the posts B, and to each post A, a door, C, is attached by hinges $b$.

D represents glass plates, which are inserted between the inner posts B, and complete the inner case of the hive, a space, $c$, being allowed between the glass plates D and the doors C.

This inner case extends downward a trifle below the exterior case, and a notch, $d$, is made in the lower edge of one of the lower cross-pieces $a$, to serve as a bee-entrance.

By this mode of construction, a very strong and desirable bee-hive is obtained, one which will not afford a harbor for the bee-moth, for by opening the doors C, the eggs and moth may all be cleaned out without any trouble or difficulty whatever.

The double case causes the interior of the hive to be kept at an even temperature.

The hive is ventilated by having an opening, $e$, made in its top $f$, as shown clearly in fig. 1.

I claim as new, and desire to secure by Letters Patent—

A bee-hive constructed with a double case, the exterior one being provided with a door, C, at each side, and the interior one provided at each side with a glass plate, D, all being constructed and arranged in the manner substantially as and for the purpose set forth.

JOSEPH CHASE.

Witnesses:
 JOHN McCAGEN,
 A. G. COLLINS.